April 7, 1931.  F. WOLF  1,799,543
CORN LOADING MACHINE
Filed May 29, 1930   3 Sheets-Sheet 3
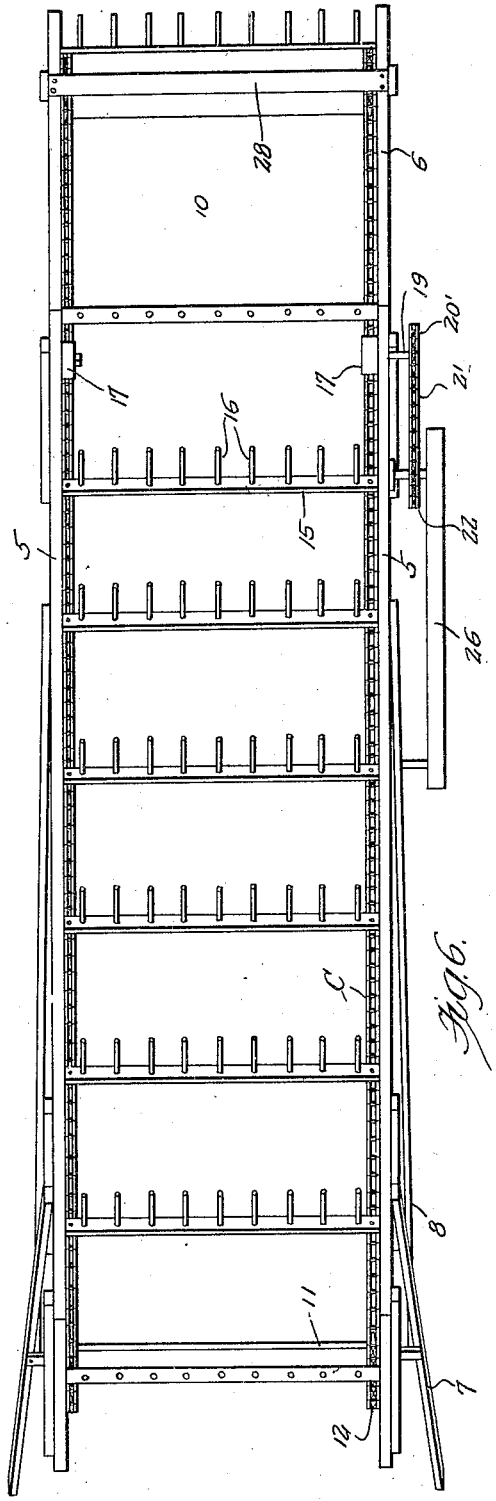
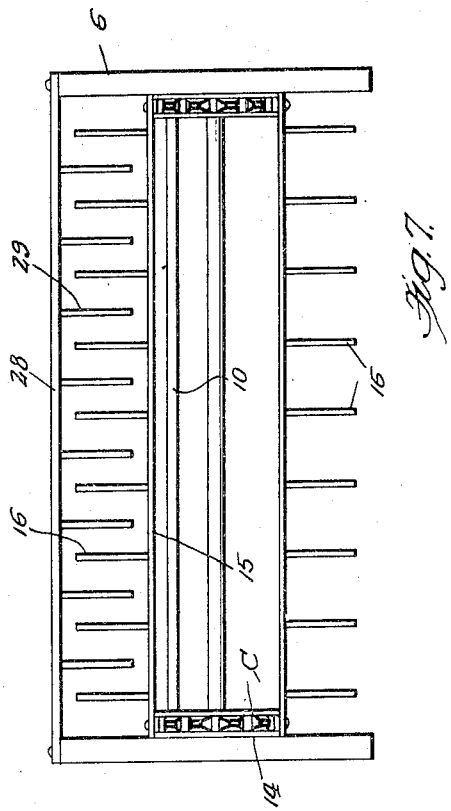
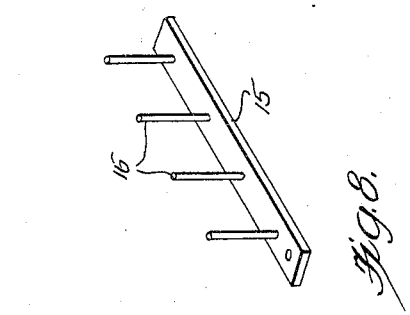
Inventor
Frank Wolf,
By *Clarence A. O'Brien*
Attorney

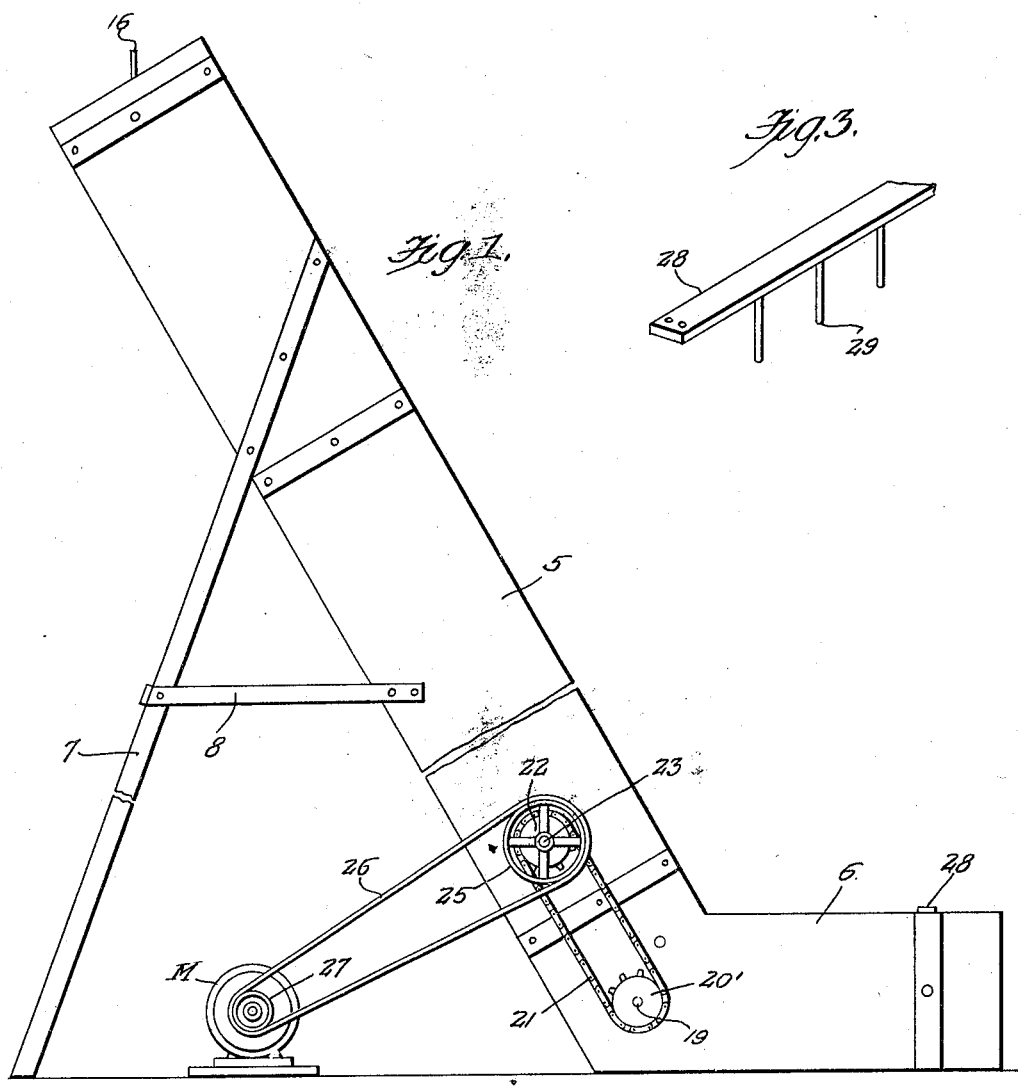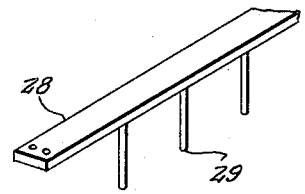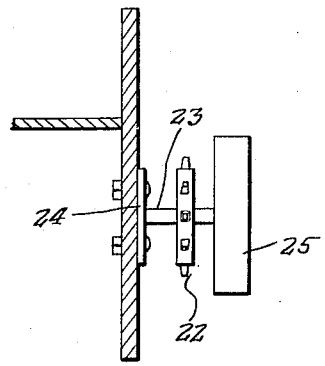

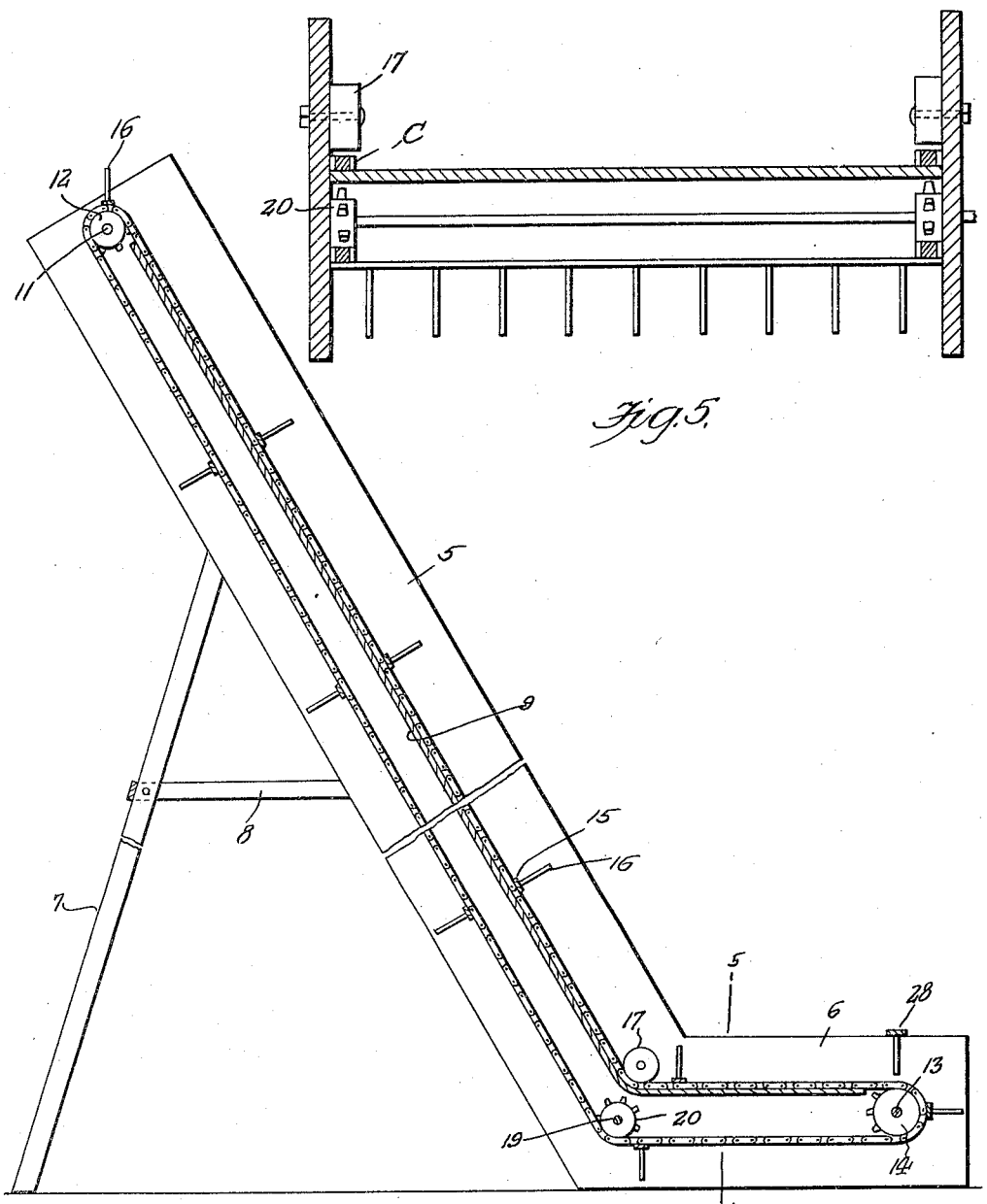

UNITED STATES PATENT OFFICE

FRANK WOLF, OF HAMILTON, OHIO

CORN-LOADING MACHINE

Application filed May 29, 1930. Serial No. 457,339.

This invention relates broadly to devices for use in farming, and has more particular reference to a device for loading corn into trucks, wagons and the like.

Broadly the invention consists in the provision of an inclined trough having an endless elevator movable thereover for carrying the corn or material to be loaded on the wagon to the upper end of the trough to be transferred from the trough on to the wagon.

A still further object of the invention is to provide a device of the above mentioned character having means associated therewith for actuating the elevator.

A still further object of the invention is to provide a corn loading device of the character above mentioned which is comparatively simple in construction, consists of but relatively few parts, and not likely to easily become out of order, strong, durable, practical, efficient and otherwise well adapted for the purpose designed.

Other objects and advantages of the invention will become apparent during a study of the following description, taken in connection with the accompanying drawings, wherein:

Figure 1 is a side elevational view of the improved corn loading machine,

Figure 2 is a fragmentary detail view partly in section and partly in elevation illustrating certain details of construction, to be hereinafter more fully referred to.

Figure 3 is a fragmentary perspective view of a catch bar forming part of the invention, Figure 4 is a longitudinal sectional view therethrough, Figure 5 is a transverse sectional view taken substantially on the line 5—5 of Figure 4, Figure 6 is a plan view of the loading machine, Figure 7 is an elevational view of the device looking at the lower end thereof, Figure 8 is a perspective view of one of the prong carrying cleats.

Referring to the drawings in detail it will be seen that my improved loader comprises a trough comprising a pair of spaced parallel upwardly and forwardly inclined side members 5—5 at their lower ends merging into spaced parallel horizontal extensions 6. The side members 5 are supported by suitable inclined supports 7 braced with respect to the side members 5 by suitable braces 8.

Mounted between the side members 5 and extensions 6 is a flooring or plate 9, which at the lower end of the side members 9 is suitably bent to extend in a horizontal plane between the extensions 6—6.

Mounted in the trough and having its upper run movable over the floor 9 and its extension 10 is an endless elevator comprising a pair of spaced apart endless chains C the upper runs of which are movable over the top of the flooring 9 and its extension 10. The chains C are trained over sprockets 12 mounted on the opposite ends of a shaft 11 supported between the upper ends of the side members 5 forwardly of the upper edge of the floor 9, the chains being also trained over sprockets 14 mounted on the ends of a shaft 13 which extends between the extensions 6 in advance of the free edge of the floor extension 10.

The chains C are connected by cross cleats 15, the cleats 15 being suitably spaced with respect to one another and at their ends secured to the runs of the respective chains in any suitable manner. Each of the cleats 15 are provided with a plurality of longitudinally spaced upstanding prongs or teeth 16 for engaging with the corn or material for moving the material upwardly over the floorings 9 and 10 to the upper end of the trough to be deposited therefrom into a wagon or other vehicle to be loaded.

At the junction of the floor 9 and extension 10 there is suitably supported on each of the side members 5 suitable rollers 17 for engaging the upper runs of the chains so that the chains will follow the bend of the flooring or member 9.

Extending between the side members 5 beneath the flooring at the point of bend of the flooring is a shaft 19 having thereon a pair of sprockets 20 one for each of the chains C and engaged with the lower runs of the chain in the manner suggested in Figure 4. The shaft 19 projects laterally of one of the side members 5 and on its extended end has a relatively large sprocket wheel 20' thereon.

Also projecting laterally from said one side member 5 is a stub shaft 23 one end of which is suitably supported by a suitable bracket 24 secured to said one side member 5. On the stub shaft 23 is a sprocket wheel 22, and a sprocket chain 21 is trained over the sprocket 20' and sprocket 22.

On the end of the shaft 23 is a relatively large pulley wheel 25 over which is trained an endless belt 26, the belt 26 being also trained over a pulley 27 on the motor shaft of an electric motor M.

Supported on the upper edges of the extensions 6 is a catch bar 28 extending between the members 6, the catch bar 28 having depending therefrom a plurality of vertically disposed longitudinally spaced catch fingers 29 arranged in alternate relation with respect to the fingers 16 on the cleats 15 to permit free movement of the fingers 16 to the stationary fingers 29. The fingers of the catch bar will aid in retaining the material on the horizontal portion of the elevator and against being forced off the end of the elevator at the bottom of the latter, thus preventing waste, that may be occasioned during loading of the material onto the lower horizontal portion of the elevator.

It is thought that the operation of the device is apparent from the foregoing description, taken in connection with the accompanying drawings and that in operation the material, such as grain, corn and the like to be elevated for loading into a wagon will be placed on the floor extension 10 in advance of catch bars 28, to be engaged by the fingers 16 and moved upwardly along the floor 9 by the fingers 16 during travel of the chains C. As the grain reaches the upper end of the trough the grain will of course fall into the wagon or like vehicle to be loaded.

The elevator is actuated from the motor M, motion being transmitted to the shaft 19 through the medium of the belt and pulley connection between the motor and shaft 23 and the chain in sprocket connection between the shaft 23 and the shaft 19 which obviously rotates the sprocket 20 for moving the chains C in the proper direction, so that the upper runs of the chains move over the floorings 9 and 10 toward the upper end of the device.

Even though I have herein shown and described the preferred embodiment of my invention, it is to be understood that the same is susceptible to changes fully comprehended by the spirit of the invention as herein described, and the scope of the appended claim.

Having thus described my invention, what I claim as new is:

In a loading device of the class described, a pair of spaced side members arranged at an incline, supports therefor, said side members at their lower ends terminating in spaced parallel extensions, a bottom forming member between said side members merging at its lower end into a horizontal extension arranged between the extensions of said side members, an elevator movable between said side members and their extension, means for operating said elevator, said elevator comprising a plurality of longitudinally spaced cross cleats extending transversely between said side members, said cleats respectively provided with a plurality of longitudinally spaced fingers extending therefrom, a catch bar extending between the said extensions of said side members above the said extension of said floor, and catch fingers extending downwardly from said catch bar in spaced relation, said catch fingers being arranged in alternate relation with respect to the fingers on said cleats.

In testimony whereof I affix my signature.

FRANK WOLF.